US012789295B2

(12) United States Patent
Fechner et al.

(10) Patent No.: US 12,789,295 B2
(45) Date of Patent: Nov. 10, 2026

(54) LASER MARKING SYSTEM

(71) Applicant: ALLTEC ANGEWANDTE LASERLICHT TECHNOLOGIE GMBH, Selmsdorf (DE)

(72) Inventors: Matthias Fechner, Reinbek (DE); Andreas Luechow, Schoenwalde (DE); Till Franitza, Lubeck (DE)

(73) Assignee: Alltec Angewandte Laserlicht Technologies GmbH, Selmsdorf (DE)

( * ) Notice: Subject to any disclaimer, the term of this patent is extended or adjusted under 35 U.S.C. 154(b) by 523 days.

(21) Appl. No.: 17/761,757

(22) PCT Filed: Sep. 18, 2020

(86) PCT No.: PCT/EP2020/076195
§ 371 (c)(1),
(2) Date: Mar. 18, 2022

(87) PCT Pub. No.: WO2021/053197
PCT Pub. Date: Mar. 25, 2021

(65) Prior Publication Data

US 2022/0371129 A1 Nov. 24, 2022

(30) Foreign Application Priority Data

Sep. 20, 2019 (GB) ..................................... 1913629

(51) Int. Cl.
*B41J 2/46* (2006.01)
*B23K 26/382* (2014.01)
(Continued)

(52) U.S. Cl.
CPC ............. *B23K 26/382* (2015.10); *B41J 2/442* (2013.01); *B41J 2/45* (2013.01); *B41J 2/46* (2013.01); *B41J 2/475* (2013.01); *B41J 2/435* (2013.01)

(58) Field of Classification Search
CPC .. B23K 26/382; B23K 26/064; B23K 26/127; B23K 26/128; B23K 26/21; B23K 26/38;
(Continued)

(56) References Cited

U.S. PATENT DOCUMENTS

2011/0069376 A1* 3/2011 Diening .............. H01S 3/06758 359/341.1
2016/0276800 A1 9/2016 Clowes et al.
2019/0027888 A1* 1/2019 Durkin ................ H01S 3/06754

FOREIGN PATENT DOCUMENTS

CN 1890048 1/2007
CN 105728948 7/2016
(Continued)

OTHER PUBLICATIONS

"CN Application No. 202080080417.7, First Office Action", Mar. 29, 2024, 14 pages.
(Continued)

*Primary Examiner* — Henok D Legesse
(74) *Attorney, Agent, or Firm* — DeLizio, Peacock, Lewin & Guerra LLP

(57) ABSTRACT

An electromagnetic radiation system (100) for directing an electromagnetic radiation beam at a target (130). The electromagnetic radiation system comprises an electromagnetic radiation source (110) for providing the electromagnetic radiation beam, a head (120) for projecting the electromagnetic radiation beam on to the target (130); and an umbilical assembly (140) connecting the electromagnetic radiation source (110) to the head (120) and configured to transmit the electromagnetic radiation beam to the head. The electromagnetic radiation system further comprises an optical isolator (150) positioned between the electromagnetic radiation source (110) and the umbilical assembly (140).

18 Claims, 8 Drawing Sheets

(51) Int. Cl.

| | |
|---|---|
| ***B41J 2/44*** | (2006.01) |
| ***B41J 2/45*** | (2006.01) |
| ***B41J 2/475*** | (2006.01) |
| *B41J 2/435* | (2006.01) |

(58) Field of Classification Search

CPC ...... B23K 26/706; B23K 37/006; B41J 2/442; B41J 2/45; B41J 2/46; B41J 2/475; B41J 2/435; B41J 2/4753

See application file for complete search history.

(56) References Cited

FOREIGN PATENT DOCUMENTS

| | | | | |
|---|---|---|---|---|
| CN | 205587841 | | 9/2016 | |
| CN | 106274072 | | 1/2017 | |
| CN | 108098148 | A | 6/2018 | |
| CN | 108701952 | | 10/2018 | |
| CN | 209078042 | | 7/2019 | |
| DE | 10059246 | | 6/2002 | |
| DE | 10059246 | C2 * | 2/2003 | ........... B23K 26/361 |
| DE | 102015211426 | | 12/2016 | |
| EP | 2540434 | | 1/2013 | |
| JP | H11103112 | | 4/1999 | |
| JP | 2003279444 | | 1/2003 | |
| JP | 2004252160 | | 9/2004 | |
| JP | 2004337970 | A | 12/2004 | |
| JP | 2008155246 | | 7/2008 | |
| JP | 2012234978 | A * | 11/2012 | |
| JP | 2012253100 | A | 12/2012 | |
| JP | 2014224898 | | 12/2014 | |
| JP | 6191536 | | 9/2017 | |
| JP | 2019010651 | | 1/2019 | |
| WO | 2012036664 | | 3/2012 | |
| WO | 2013133415 | | 9/2013 | |
| WO | 201612116 | | 1/2016 | |

OTHER PUBLICATIONS

PCT/EP2020/076195 International Search Report and Written Opinion, dated Feb. 4, 2021, 20 pages.

Search Report for GB1913629.0, dated Mar. 6, 2020, 6 pages.

"CN Application No. 202080080417.7 Second Office Action", Jan. 10, 2025, 10 pages.

"Japanese Office Action for JP Application No. 2022-517939", Oct. 15, 2024, 8 pages.

"JP 2022-517939 Decision to Grant", 2 pages.

1 "CN Application No. 202080080417.7, Office Action", May 23, 2025, 15 pages.

"Chinese Patent Application No. 202080080417.7 Office Action", Nov. 3, 2025, 9 pages.

* cited by examiner

LASER MARKING SYSTEM

TECHNICAL FIELD

The present invention relates to an electromagnetic radiation system such as a laser marking system. Aspects and implementations of the present disclosure are directed generally to laser scanning and laser marking equipment.

BACKGROUND

Current laser markers and scanners are limited during automated production operations in packaging as well as in parts marking production lines. Current laser markers and scanners are typically fixed into production systems relative to articles being marked.

Known laser marking systems often comprise multiple bulky housings for different components of the laser marking system. For example, known laser marking systems often comprise a housing for a laser source, a housing for an extraction device, a housing for a cooling system, a large radiation shielding unit to envelope a part of a production line, and a plurality of inflexible cables and/or conduits connecting different components of the laser marking system together. This tends to make known laser marking systems large, heavy, cumbersome systems that are inflexible in use, difficult to install on a production line and difficult to manoeuvre about the production line. Safety requirements associated with known laser marking systems (e.g. radiation safety requirements and/or fume extraction requirements) also add to the difficulty in installing and safely using known laser marking systems. In order to install and use known laser marking systems, a production line owner typically must first organise an assessment of their production line with safety officers such that customised laser marking system components (e.g. a radiation shielding unit) can be designed and built for their unique production line, resulting in an expensive and time consuming process. The difficulty associated with known laser marking systems is such that there is reluctance amongst production line owners to replace different marking systems (e.g. continuous inkjet marking systems) with the known laser marking systems.

It is an object of the present invention to provide a laser marking system that obviates or mitigates one or more problems of the prior art whether identified herein or elsewhere.

SUMMARY

Aspects and embodiments disclosed herein provide for the easy integration and operation of optical scanning or marking systems, for example, laser scanning or marking systems, into production systems.

In a first aspect there is provided an electromagnetic radiation system for directing an electromagnetic radiation beam at a target. The system comprises an electromagnetic radiation source for providing the electromagnetic radiation beam; a head for projecting the electromagnetic radiation beam on to the target; and an umbilical assembly connecting the electromagnetic radiation source to the head and configured to transmit the electromagnetic radiation beam to the head. The electromagnetic radiation system further comprises an optical isolator positioned between the electromagnetic radiation source and the umbilical assembly.

The electromagnetic radiation source may comprise an optical gain medium. The electromagnetic radiation source may comprise a fiber laser. The electromagnetic radiation source may comprise an optical fiber amplifier. The optical isolator may be positioned between the optical fiber amplifier and the umbilical. The optical fiber amplifier may be a final optical amplification stage of the electromagnetic radiation system. The optical fiber amplifier may be a final optical gain medium of the electromagnetic radiation system. The electromagnetic radiation beam may be fully amplified before exiting the electromagnetic radiation source.

The head may comprise a collimator. The collimator may be configured to receive electromagnetic radiation from the umbilical assembly that is generated by the source of electromagnetic radiation.

In fiber lasers, laser light can be guided effectively within a fiber core. Combining fiber-based components is relatively straightforward such that laser light can be directed between fiber-based components of a laser marking system relatively easily. In contrast, once laser light exits fiber and becomes a free space laser it is hard to focus it again in a precise and stable way and, for example, to couple it back into an optical fiber. Optical isolators are typically made from three distinct components that require light to be transmitted through free space. Typical fiber laser marking systems are configured such that an optical isolator is provided at the marking head so that light is transmitted through fiber-based components until passing into free space in the marking head. Typical fiber laser marking systems therefore provide an optical isolator in the marking head of the laser marking system. The inventors have realised that providing an optical isolator separate from the marking head allows substantial improvements to be made to the dimensions of a marking head.

The electromagnetic radiation system may be, for example, a laser marking system. It will, however, be appreciated that the electromagnetic radiation system may be used for purposes other than laser marking such as laser welding, laser cutting, laser drilling and the like.

The umbilical assembly may comprise an optical fiber configured to transmit the electromagnetic radiation beam from the laser source to the head. The optical fiber configured to transmit the electromagnetic radiation beam from the laser source to the head may be a passive fibre. The optical isolator may be provided after (i.e. optically downstream) any optical amplifier component in an optical path defined between the electromagnetic radiation source and the target. Thus, the optical isolator may be provided between the optical fiber amplifier and the passive fibre. The optical fiber amplifier may act to transport and amplify the electromagnetic radiation beam, whereas the passive fibre may solely act to transport the electromagnetic radiation beam.

A length of the optical fiber may be greater than a length of the umbilical assembly. The collimator may be optically coupled to the optical isolator by the optical fiber. The collimator and/or optical isolator may be integrally formed with the optical fiber. The collimator and/or optical isolator may be coupled such that, once coupled, they cannot be separated from the optical fiber.

The umbilical assembly may comprise one or more wires configured to detect failure of the optical fiber. The system may further comprise a monitor configured to monitor an electrical property of the one or more wires. The monitor may be configured to monitor a continuity of the one or more wires.

The umbilical assembly may comprise an elongate member having a relatively low elasticity. The elongate member may be mechanically coupled to a cabinet and/or a marking head. The relative length of the optical fiber to the length of the umbilical assembly and/or the elongate member may prevent or reduce damage caused to the optical fiber, for example by stretching of the optical fiber during installation of the system in a production environment.

The system may further comprise a cabinet. The electromagnetic radiation source may be configured within the cabinet. The optical isolator may additionally be configured within the cabinet. The cabinet may be installed in a first location and the head may be installed in a second location separate from the cabinet. The umbilical may transmit optical and electrical signals from the cabinet to the head. The head may house relatively small components whereas the cabinet may house relatively large components such that a compact head may be provided. A compact head provides for the laser system to be more easily installed in a production environment.

The system may further comprise a moveable assembly. The moveable assembly may be configured to move the head relative to the target. For example, the moveable assembly may form part of a CNC machine or a robotic arm. In use, the moveable assembly may move the head relative to a target of the electromagnetic radiation. Aspects may therefore allow laser systems to be installed and used in environments that were not heretofore possible.

The system may further comprise a holder for the head. The system may be configured such that electromagnetic radiation is emitted from the head if the head is in a predetermined configuration relative to the holder but to prevent electromagnetic radiation being emitted from the head if the head and holder are not in the predetermined configuration. It will be appreciated that the compact form factor for a head provided herein is such that additional safety features are desirable to prevent electromagnetic radiation being emitted accidentally or erroneously.

A second aspect provides a method of manufacturing an electromagnetic radiation system. The radiation system may comprise: a head for projecting an electromagnetic radiation beam on to a target; an umbilical housing comprising an elongate tube having a first opening at a first end of the elongate tube and a second opening at a second end of the elongate tube; and an optical assembly comprising a collimator and an optical isolator for receiving electromagnetic radiation from an electromagnetic radiation source, the collimator and optical isolator connected by an optical fiber. The method may comprise: passing the collimator through the umbilical housing from the first opening to the second opening; and configuring the collimator within the head.

The optical isolator, collimator and optical fiber may be integrally formed. That is, the isolator, collimator and optical fiber may be such that it is not possible to separate the components from one another once those components have been manufactured during subsequent assembly of the electromagnetic radiation system. Configuring the collimator within the head may comprise fixing the collimator within the head. The collimator may be fixed so as to direct a collimated beam to a steering mechanism of the head that allows for variable direction of the collimated beam to a target. The electromagnetic radiation source may comprise a fiber laser. The electromagnetic radiation system may be a laser marking system, although it will be appreciated that the subject matter described herein may also be used in systems other than laser marking systems. The elongate tube may have a continuous diameter and may have no openings other than the opening at the first end and second end. That is, the elongate tube may be formed such that items are required to be passed along the length of the tube (rather than, for example, opening a side of the tube to insert components). In some embodiments the elongate tube may have openings other than the first end and second end, for example providing access ports, but that do not extend along the length of the tube. The openings other than the first end and second end, if provided, may be sealed in use by other components, or may be provided such that sealing of the openings is straightforward. When the optical fiber is installed in the conduit housing, the optical fiber is enclosed by the elongate tube such that the optical fiber cannot be extracted from the conduit housing without passing through a substantial part of the tube. This may provide advantages in hygiene and cleaning, for example providing an umbilical that is resistant to ingress of fluids and that may meet IP standards, but may place limitations on a manufacturing process given that integrally formed components or components that are challenging to separate once connected may be required to either be connected during manufacture or passed through the umbilical. The inventors have realised that it is possible to provide an optical assembly that comprises a collimator and an optical isolator connected by an optical fiber that allows manufacture of a system that has a relatively compact head whilst also providing an advantageous umbilical.

A third aspect provides an electromagnetic radiation system for directing an electromagnetic radiation beam at a target comprising a head, the head being configured to be held by a holder, wherein the system is configured to permit use of the head only if the head is held by a holder in a predetermined configuration, the predetermined configuration being determined based upon an interaction between cooperating features of the holder and the head.

By use of the head, it is meant use of the head to emit the electromagnetic radiation beam at the target. Since the electromagnetic radiation beam may be harmful if it is directed at an operator or towards unshielded areas, it is beneficial to provide a safety device which prevents operation if safety cannot be confirmed. The cooperating features of the holder and the head may be arranged in such a way to provide confirmation that the head is in a safe configuration.

The cooperating features of the holder and the marking head may comprise a switch and a switch activating portion. One of the switch and a switch activating portion may be provided on the marking head and the other of the switch and the switch activating portion may be provided on the holder. The switch may be shielded from accidental activation. The switch may be disposed in a recess. The recess may provide protection for the switch such that it cannot be activated accidentally. The recess may be provided in a housing of the head. The switch activating portion may comprise a protruding feature configured to extend into the recess and to activate the switch when the head is received in the holder in the predetermined configuration. The electromagnetic radiation system may comprise a plurality of switches and a respective plurality of switch activating portions. For example, in some embodiments two switches may be provided on opposing sides of the head. The head may be a cylindrical head.

The electromagnetic radiation system may comprise an electronic identifier configured to determine whether the system is in the predetermined configuration. The predetermined configuration may be a safe configuration. The holder may be configured to releasably secure the marking head in the holder. The holder may be configured to releasably secure the marking head in the predetermined configuration. The electromagnetic radiation system may comprise a plurality of holders, each one of the plurality of holders being configured to hold the marking head in a different marking configuration. The system may be configured to permit use of the head only if the head is held by one of said plurality of holders in one of a respective plurality of predetermined configurations. Each of the predetermined configurations may be a safe configuration. The system may be configured to identify which one of the holders the head is held by based upon an interaction between cooperating features of said one of the holders and the head. The electromagnetic radiation beam may be laser beam. The system may be a laser marking system. The head may be referred to as a marking head. The system may comprise the holder.

According to a fourth aspect, there is provided a system comprising: an electromagnetic radiation system according to the first or third aspect, and a processing line configured to transport products to be processed past a processing station. The electromagnetic radiation system is configured to direct said radiation beam at products located at the processing station.

The electromagnetic radiation system may comprise optional features described above with reference to the first aspect, and also features described above with reference to the third aspect. The electromagnetic radiation system may comprise features described above with reference to the first aspect in combination with features described above with reference to the third aspect.

The system may further comprise a safety shield configured to substantially enclose the processing station, wherein said head is the only component of said electromagnetic radiation system provided within the safety shield.

In this way, the size of an area enclosed can be minimised, allowing the bulky components of the electromagnetic radiation system (e.g. the electromagnetic radiation source, and the optical isolator) to remain outside of the safety shield.

The umbilical may extend out of the safety shield, providing a connection to the remaining components of the electromagnetic radiation system. That is, a portion of the umbilical assembly may also be present within the safety shield. In such an arrangement, the marking head may still be considered to be the only component of the radiation system within (e.g. entirely within) the safety shield.

The system may further comprise a moveable assembly, said moveable assembly being configured to support the head, and to move the head relative to products located at the processing station.

By providing a compact marking head, it can more easily be mounted on a moveable assembly (e.g. a robot arm), allowing marking to be performed in a wide range of applications.

In this way, a single marking head can be used to mark (or otherwise process) products on multiple faces, avoiding the need to make complex manipulations of the product, or to provide multiple marking systems or marking heads.

The moveable assembly may be configured to move the marking head in three dimensions.

The moveable assembly may be configured to move relative to products located at the processing station between a first configuration and a second configuration and the electromagnetic radiation system may be configured to apply a mark to said products in at least one of the first and second configurations.

The electromagnetic radiation system may be configured to apply a first mark to a first portion of said product when the head is in the first configuration, and to apply a second mark to a second portion of said product when the head is in the second configuration. The first mark and the second mark may be different. The first portion and the second portion may be different. In this way, the effective field of view of the marking system can be extended.

The system may comprise at least two head mounting locations for mounting said head, each mounting location being configured to support the head for projecting the electromagnetic radiation beam on to a product provided at a processing location.

Each head mounting location may comprise a respective holder.

By providing a compact marking head, and a system having two or more mounting locations, it is possible to provide a flexible marking system that can be quickly reconfigured to mark different products.

According to a further aspect, there is provided a system comprising an electromagnetic radiation system for directing an electromagnetic radiation beam at a product, and a processing line configured to transport products to be processed past a processing station. The electromagnetic radiation system comprises an electromagnetic radiation source for providing the electromagnetic radiation beam; a head for projecting the electromagnetic radiation beam on to the product; and an umbilical assembly connecting the electromagnetic radiation source to the head and configured to transmit the electromagnetic radiation beam to the head. The electromagnetic radiation system is configured to direct said radiation beam at products located at the processing station.

The head may be a marking head having a compact form factor. The marking head may have a first dimension in a first direction of less than around 400 mm and a second dimension in a second direction perpendicular to the first direction of less than around 60 mm. The marking head may have a third dimension in a third direction perpendicular to the first direction and the second direction of less than around 60 mm. The marking head may be substantially cylindrical.

The system may further comprise a safety shield configured to substantially enclose the processing station, wherein said head is the only component of said electromagnetic radiation system provided within the safety shield.

Providing a head having a compact form factor provides a more versatile system, and allows a smaller safety enclosure to be provided at the processing station. In this way, the size of an area enclosed can be minimised, allowing the bulky components of the electromagnetic radiation system (e.g. the electromagnetic radiation source, and the optical isolator, where present) to remain outside of the safety shield.

The umbilical may extend out of the safety shield, providing a connection to the remaining components of the electromagnetic radiation system. That is, a portion of the umbilical assembly may also be present within the safety shield. In such an arrangement, the marking head may still be considered to be the only component of the radiation system within (e.g. entirely within) the safety shield.

The system may further comprise a moveable assembly, said moveable assembly being configured to support the head, and to move the head relative to products located at the processing station. By providing a compact marking head, it can more easily be mounted on a moveable assembly (e.g. a robot arm), allowing marking to be performed in a wide range of applications.

In this way, a single marking head can be used to mark (or otherwise process) products on multiple faces, avoiding the need to make complex manipulations of the product, or to provide multiple marking systems or marking heads.

The moveable assembly may be configured to move the marking head in three dimensions.

The moveable assembly may be configured to move relative to products located at the processing station between a first configuration and a second configuration and the electromagnetic radiation system may be configured to apply a mark to said products in at least one of the first and second configurations.

The electromagnetic radiation system may be configured to apply a first mark to a first portion of said product when the head is in the first configuration, and to apply a second mark to a second portion of said product when the head is in the second configuration. The first mark and the second mark may be different. The first portion and the second portion may be different. In this way, the effective field of view of the marking system can be extended.

The system may comprise at least two head mounting locations for mounting said head, each mounting location being configured to support the head for projecting the electromagnetic radiation beam on to a product provided at a processing location.

Each head mounting location may comprise a respective holder.

By providing a compact marking head, and a system having two or more mounting locations, it is possible to provide a flexible marking system that can be quickly reconfigured to mark different products.

The electromagnetic radiation system may further comprise an optical isolator positioned between the electromagnetic radiation source and the umbilical assembly.

The electromagnetic radiation source may comprise an optical gain medium. The electromagnetic radiation source may comprise a fiber laser. The electromagnetic radiation source may comprise an optical fiber amplifier. The optical isolator may be positioned between the optical fiber amplifier and the umbilical. The optical fiber amplifier may be a final optical amplification stage of the electromagnetic radiation system. The optical fiber amplifier may be a final optical gain medium of the electromagnetic radiation system. The electromagnetic radiation beam may be fully amplified before exiting the electromagnetic radiation source.

The head may comprise a collimator. The collimator may be configured to receive electromagnetic radiation from the umbilical assembly that is generated by the source of electromagnetic radiation.

In fiber lasers, laser light can be guided effectively within a fiber core. Combining fiber-based components is relatively straightforward such that laser light can be directed between fiber-based components of a laser marking system relatively easily. In contrast, once laser light exits fiber and becomes a free space laser it is hard to focus it again in a precise and stable way and, for example, to couple it back into an optical fiber. Optical isolators are typically made from three distinct components that require light to be transmitted through free space. Typical fiber laser marking systems are configured such that an optical isolator is provided at the marking head so that light is transmitted through fiber-based components until passing into free space in the marking head. Typical fiber laser marking systems therefore provide an optical isolator in the marking head of the laser marking system. The inventors have realised that providing an optical isolator separate from the marking head allows substantial improvements to be made to the dimensions of a marking head.

The electromagnetic radiation system may be, for example, a laser marking system. It will, however, be appreciated that the electromagnetic radiation system may be used for purposes other than laser marking such as laser welding, laser cutting, laser drilling and the like. Such processes may collectively be referred to as processing.

The umbilical assembly may comprise an optical fiber configured to transmit the electromagnetic radiation beam from the laser source to the head. The optical fiber configured to transmit the electromagnetic radiation beam from the laser source to the head may be a passive fibre. The optical isolator may be provided after (i.e. optically downstream) any optical amplifier component in an optical path defined between the electromagnetic radiation source and the target. Thus, the optical isolator may be provided between the optical fiber amplifier and the passive fibre. The optical fiber amplifier may act to transport and amplify the electromagnetic radiation beam, whereas the passive fibre may solely act to transport the electromagnetic radiation beam.

A length of the optical fiber may be greater than a length of the umbilical assembly. The collimator may be optically coupled to the optical isolator by the optical fiber. The collimator and/or optical isolator may be integrally formed with the optical fiber. The collimator and/or optical isolator may be coupled such that, once coupled, they cannot be separated from the optical fiber.

The umbilical assembly may comprise one or more wires configured to detect failure of the optical fiber. The system may further comprise a monitor configured to monitor an electrical property of the one or more wires. The monitor may be configured to monitor a continuity of the one or more wires.

The umbilical assembly may comprise an elongate member having a relatively low elasticity. The elongate member may be mechanically coupled to a cabinet and/or a marking head. The relative length of the optical fiber to the length of the umbilical assembly and/or the elongate member may prevent or reduce damage caused to the optical fiber, for example by stretching of the optical fiber during installation of the system in a production environment.

The system may further comprise a cabinet. The electromagnetic radiation source may be provided within the cabinet. The optical isolator may additionally be provided within the cabinet. The cabinet may be installed in a first location and the head may be installed in a second location separate from the cabinet. The umbilical may transmit optical and electrical signals from the cabinet to the head. The head may house relatively small components whereas the cabinet may house relatively large components such that a compact head may be provided. A compact head provides for the laser system to be more easily installed in a production environment.

The system may further comprise a holder for the head. The system may be configured such that electromagnetic radiation is emitted from the head if the head is in a predetermined configuration relative to the holder but to prevent electromagnetic radiation being emitted from the head if the head and holder are not in the predetermined configuration. It will be appreciated that the compact form factor for a head provided herein is such that additional safety features are desirable to prevent electromagnetic radiation being emitted accidentally or erroneously.

The electromagnetic radiation system may comprise further features described above with reference to the first, second, third or fourth aspects in combination or alone.

Generally speaking, it will be appreciated that aspects can be combined such that features described in the context of one aspect may be implemented in other aspects.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labelled in every drawing. Embodiments of the invention will now be described, by way of example only, with reference to the accompanying schematic drawings, in which.

DETAILED DESCRIPTION

Figure 1:
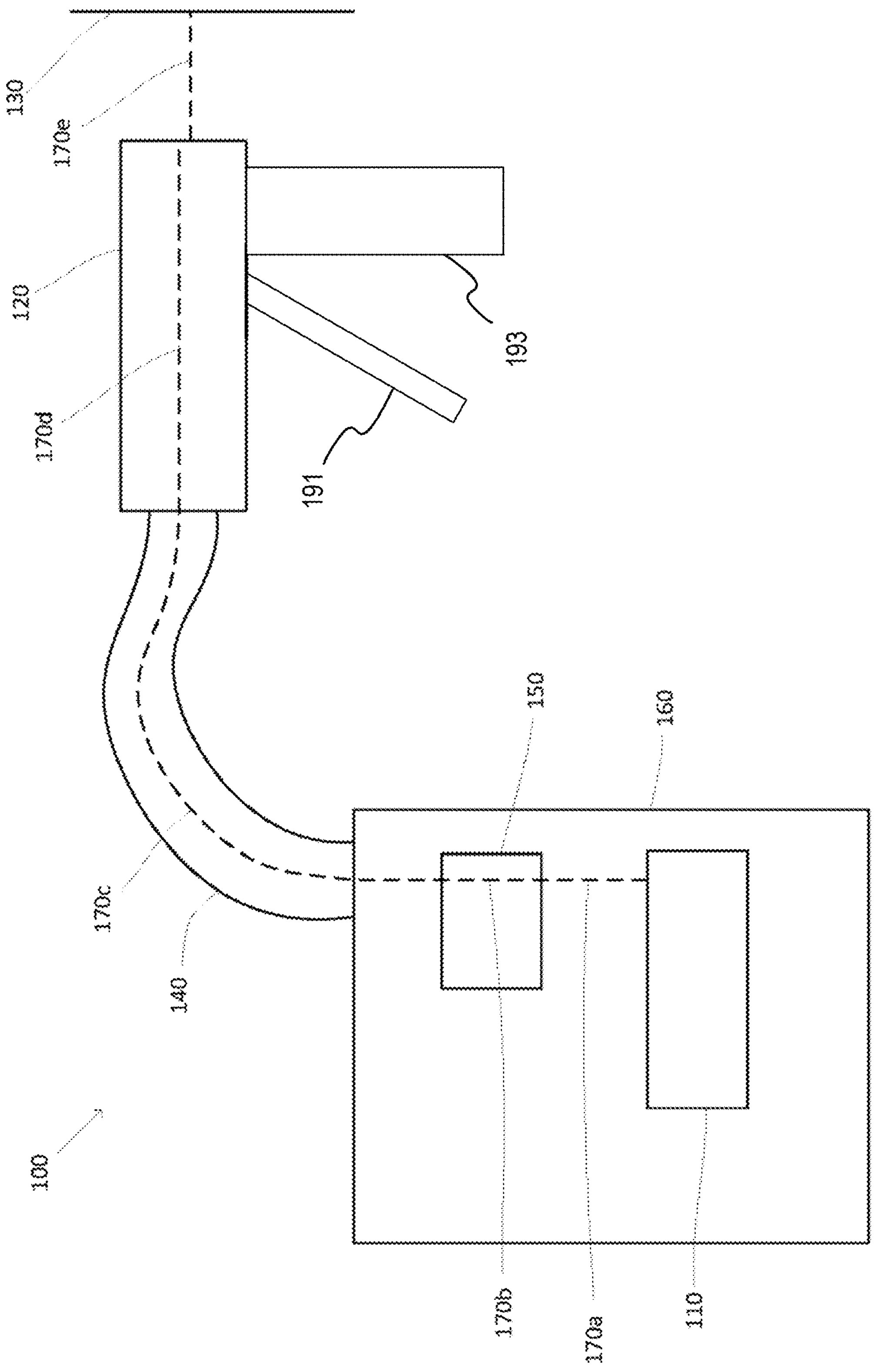
FIG. 1 schematically depicts a cross-sectional view of an exemplary laser marking system.

Aspects and embodiments disclosed herein are not limited to the details of construction and the arrangement of components set forth in the following description or illustrated in the drawings. Aspects and embodiments disclosed herein are capable of being practiced or of being carried out in various ways.

Aspects and embodiments disclosed herein include a laser system such as a laser scanning or marking system, although aspects may also include other laser systems such as laser drilling systems, laser welding systems and the like. Laser systems may be utilized in production lines for various types of articles or products. Laser marking systems may be utilized to imprint bar codes, unique identifying marks, expiration dates, or other information on items passing through a production line. In some implementations fiber lasers may be used in laser marking systems. Fiber lasers can produce beams of light in a range of wavelengths depending on the active element used but typically range from around 1000 nm to 2100 nm. Lasers utilized in laser marking systems are typically operated at laser power levels in the tens of watts, although laser power levels of kilowatts are possible. The laser may be pulsed or operated as a continuous wave. Typically pulsed operation is used for lower power applications such as marking and coding, whereas continuous wave operation is used for higher power applications such as cutting and welding.

Laser systems are not, however limited to fiber lasers and lasers of other forms may be used, including bulk solid state lasers, gas lasers, diode lasers, dye lasers and the like.

FIG. 1 schematically depicts a cross-sectional view of a laser marking system 100 according to an embodiment of the invention. The laser marking system 100 comprises a source of electromagnetic radiation such as a laser source 110 for providing a laser beam and a marking head 120 for projecting the laser beam towards a product 130. The laser source 110 and the marking head 120 are connected by an umbilical assembly 140 that transmits the laser beam from the laser source 110 to the marking head 120. The laser beam may be received by a collimator located within the marking head 120. The marking head 120 is described in further detail below with reference to FIG. 2 and the umbilical is described in further detail below with reference to FIG. 4.

The laser marking system 100 further comprises an optical isolator 150 between the laser source 110 and the umbilical 140 such that the optical path of the laser beam provided by the laser source 110 passes through the optical isolator 150 before entering the umbilical 140. The laser source 110 and optical isolator may be housed within a cabinet 160. The cabinet and additional components that may be contained within the cabinet are described below with reference to FIG. 3.

The optical path of the laser beam from the laser source 110 to the product 130 is shown schematically in FIG. 1 by optical paths 170*a* to 170*e*. A first optical path 170*a* is defined between an output of the laser source 110 and the optical isolator 150. The first optical path may be provided by an optical fiber such as an optical fiber amplifier. A second optical path 170*b* is defined through the optical isolator 150. The second optical path 170*b* allows light to be transmitted from the laser source 110 to the umbilical 140 but prevents light being transmitted from the umbilical 140 to the laser source 110. The optical isolator therefore prevents light received into the umbilical through the marking head 120, for example reflected light emitted from the print head, entering the laser source 110 and prevents damage to the laser source 110.

A third optical path 170*c* is defined through the umbilical 140. The third optical path may be provided by a further optical fiber such as a transport fiber (sometimes referred to as a passive optical fiber). A fourth optical path 170*d* is defined through the marking head and a fifth optical path 170*e* is defined from the marking head to the product 130. The fourth optical path generally includes one or more components that allow the optical path to be modified as the laser beam passes through the marking head. Modification of the fourth optical path 170*d* within the marking head causes the fifth optical path 170*e* to also be modified such that the fifth optical path intersects the product in one of a plurality of marking positions. The laser beam emitted from the laser source 110 can therefore be controlled so as to mark product 130 in any one of the plurality of marking positions (or providing cutting or welding of a surface in other embodiments). It will be appreciated that other optical paths 170*a* to 170*e* may also comprise additional components that modify the optical path within or between components.

It can be understood that the provision of the optical isolator 150 between the first optical path 170*a*, which is provided by an optical fiber amplifier (i.e. an active gain medium), and the third optical path 170*c*, which is provided by a transport optical fiber (i.e. a passive fiber), ensures that while reflections from a product 130 being marked (or other reflective surfaces, or even internal components of the marking head 120) may reach and be transported by the passive transport fiber, they cannot reach the optical fiber amplifier. If such reflections were to reach the optical fiber amplifier, further amplification could take place, potentially resulting in significant damage to the optical fiber amplifier and/or other components of the laser source.

Considered in another way, an optical isolator is provided downstream in the optical path (i.e. 170*a*-170*e*) of the last gain stage or optical amplifier, but crucially is not provided within the marking head 120. As such, the laser source (and any active amplifying components) are protected from any potentially damaging back reflections, while the small size of the marking head 120 (which would ordinarily house an optical isolator) is preserved. No optical isolator component is provided (or required) outside of the cabinet 160.

In use, a controller converts marking instructions to control signals for the laser source 110 and marking head 120 to provide laser marking on a surface of the product. In some implementations, the laser marking system 100 includes a moveable assembly 191 that is operatively connected to the head to move the marking head 120 relative to the target. For example, the moveable assembly 192 may form part of a CNC machine or a robotic arm. In use, the moveable assembly 191 may move the marking head 120 relative to a target of the electromagnetic radiation. In some implementations, the laser marking system 100 includes a holder 193. The laser marking system 100 may be configured such that electromagnetic radiation is emitted from the marking head 120 if the marking head 120 is in a predetermined configuration relative to the holder 193 but to prevent electromagnetic radiation being emitted from the marking head 120 if the marking head 120 and the holder 193 are not in the predetermined configuration. The predetermined configuration may be determined based upon an interaction between operating features of the holder 193 and the marking head 120.

In fiber lasers, laser light can be guided effectively within a fiber core, which can be as small as 9 micrometers in diameter. Combining fiber-based components is relatively straightforward such that laser light can be directed between fiber-based components of a laser marking system relatively easily. In contrast, once laser light exits fiber and becomes a free space laser it is hard to focus it again in a precise and stable way, for example to couple it back into a 9 micrometer fiber core. Optical isolators are typically made from three distinct components that require light to be transmitted through free space. Typical fiber laser marking systems are therefore configured such that an optical isolator is provided at the marking head so that light is transmitted through fiber-based components until exiting fiber-based components into free space in the marking head at the optical isolator where it is subsequently controlled through the marking head, also in free space. The inventors have realised, however, that providing an optical isolator separate from the marking head allows substantial improvements to be made to the dimensions of a marking head given typical size requirements of optical isolators.

Figure 2:
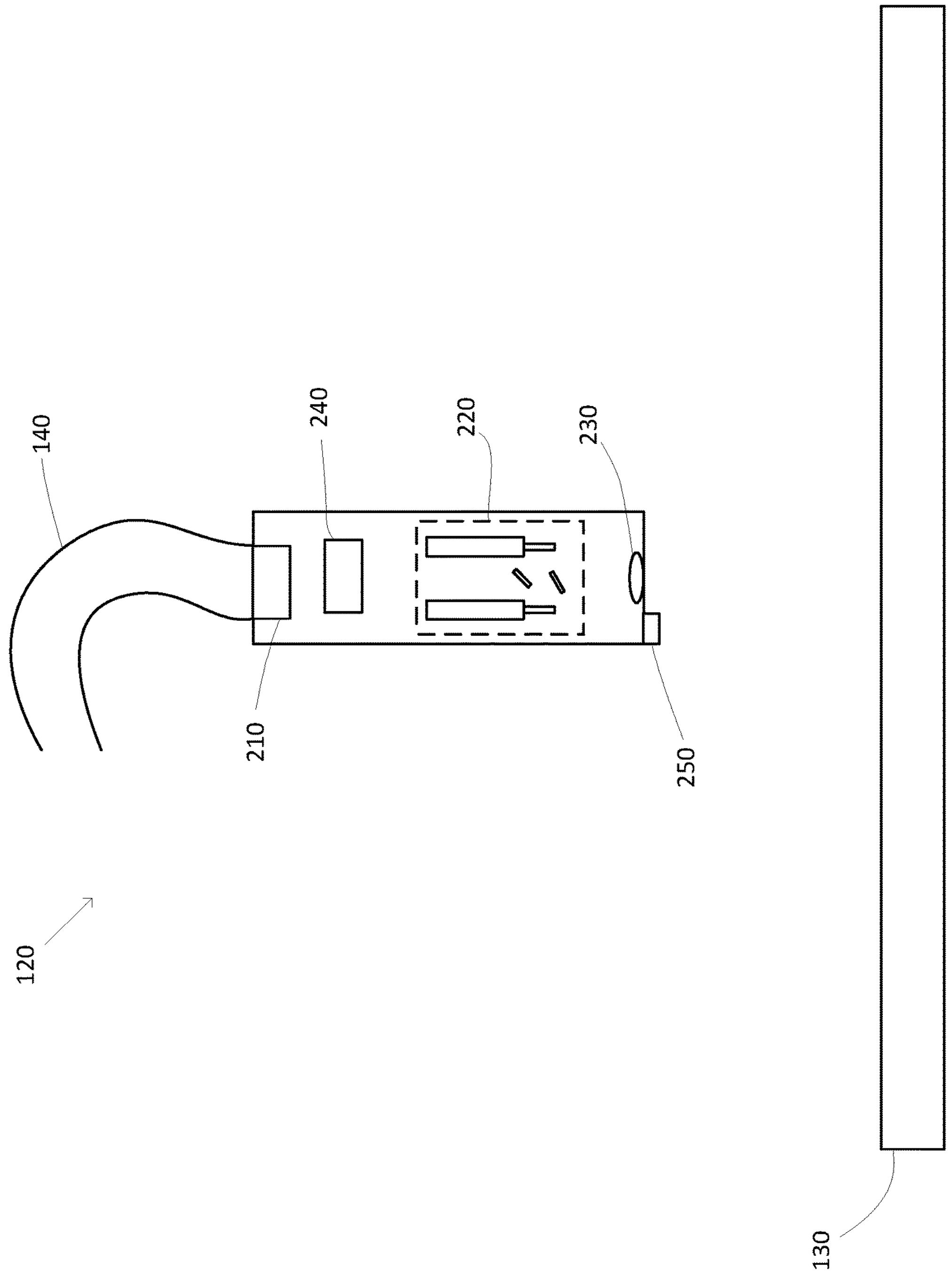
FIG. 2 schematically depicts a magnified cross-sectional view of a marking head of the laser marking system of FIG. 1.

FIG. 2 schematically depicts a magnified cross-sectional view of the marking head 120 of FIG. 1. The marking head 120 comprises a receiving portion 210 for receiving a laser beam into the marking head from the umbilical 140 a steering mechanism 220 configured to modify the optical path of the laser beam passing through the marking head and an optical element 230 through which the laser beam exits the marking head towards the product 130. The steering mechanism 220 allows the laser beam to be directed towards the product so as to intersect the product in one of a plurality of marking positions and to mark the product in one of the plurality of marking positions.

The receiving portion 210 may comprise a fiber collimator configured to receive the laser beam from the umbilical and to condition the radiation in a desired manner before directing the radiation to other components of the marking head such as the steering mechanism 220 (which may steer the radiation exiting the marking head in a desired manner).

In some embodiments the steering mechanism 220 is configured to have a compact form factor. For example, the steering mechanism 220 may comprise first and second actuators configured to rotate respective optical elements. The first and second actuators may be, for example, first and second galvanometers. The axis of rotation of the first and second drive mechanisms may be parallel. The axes of rotation may also be parallel to the incoming laser beam. A steering mechanism that allows a compact form factor is described in International Patent Publication Number WO2019/101886, which is incorporated herein by reference in its entirety.

The marking head 120 may be substantially cylindrical. The marking head 120 may have a first dimension in a first direction of less than around 400 mm and a second dimension in a second direction perpendicular to the first direction of less than around 60 mm. The marking head 120 may have a third dimension in a third direction perpendicular to the first direction and the second direction of less than around 60 mm. Providing the isolator separate from a marking head allows a compact form factor that has not previously been possible to achieve.

The marking head 120 may further comprise various other components. For example, the marking head 120 may comprise a focus modifier 240 configured to adjust a focal plane of the laser marking system 100. The marking head 120 may further comprise an outlet 250 for emitting compressed air from the marking head to form an air knife. The marking head 120 may further comprise focusing optics (not shown). The laser marking system may further comprise a detector configured to detect a presence of the product 130. The detector may, for example, comprise a camera. The marking head may additionally include a radiation shield (not shown).

The marking head 120 may comprise a cooling system for providing cooling to a component (e.g. actuators of the steering mechanism 220 and/or the focus modifier 240). The cooling system may be configured to use fluid provided to the marking head to cool a component of the marking head 120. The fluid may be provided so as to cool at least one component of the marking head 120 whilst isolating the fluid from the optical path of the laser, for example by providing a fluid flow path through a housing of the marking head 120 that intersects the component to be cooled. The component may intersect the fluid flow path through the housing to provide a part of the fluid flow path. The fluid may be emitted from the marking head 120 from outlet 250. The outlet 250 may be configured so as to emit fluid from the marking head to reduce matter generated by interaction of the laser beam with a surface of the product from interacting with the print head, for example by way of an air knife. That is, the same fluid used for cooling components within the marking head may also be used as an air knife. It will be appreciated that by providing a compact form for a marking head as allowed by the subject matter described herein, cooling of components within the marking head 120 may be beneficial.

Figure 3:
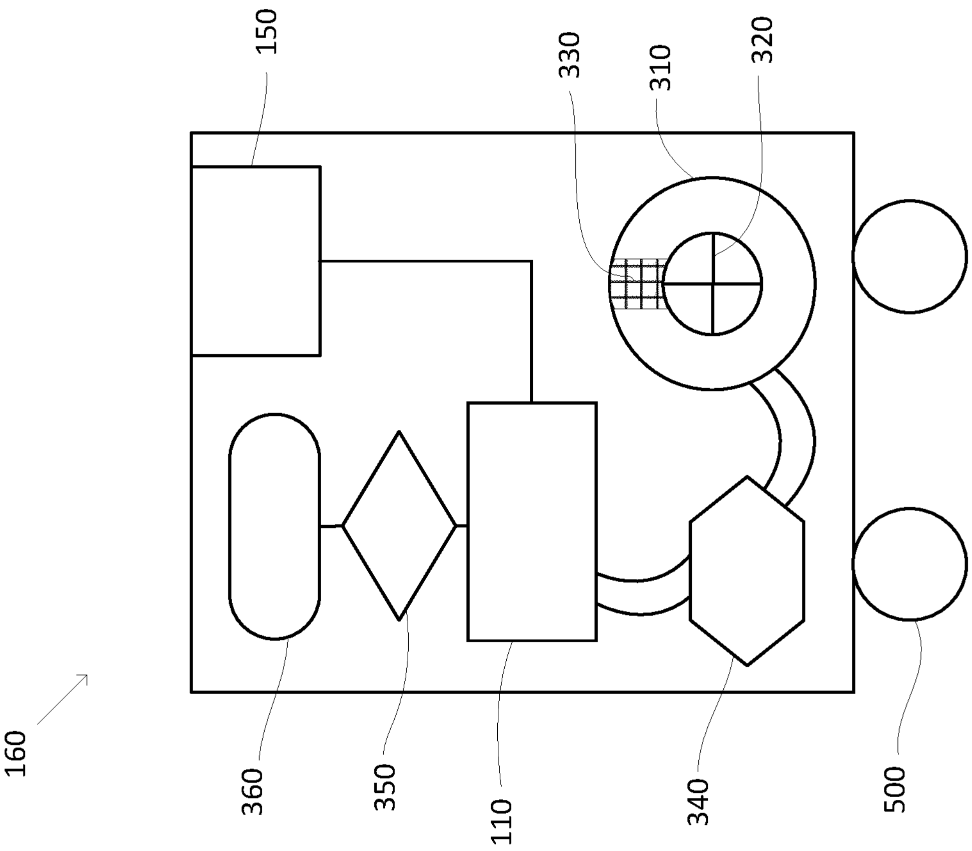
FIG. 3 schematically depicts a cross-sectional view of a cabinet of the laser marking system of FIG. 1.

Referring now to FIG. 3, the cabinet 160 of FIG. 1 is shown in further detail. As described above, the cabinet 160 houses laser source 110 and optical isolator 150. The cabinet may additionally house a cooling system 310 configured to generate a flow of fluid for cooling components within the marking head 120. The cooling system may, for example, comprise an air compressor and the fluid may be compressed air, although it will be appreciated that fluids other than air can be used. As described below with reference to FIG. 4, the fluid may be provided to the marking head through the umbilical, or may be delivered to the marking head by a fluid path that is separate to the umbilical. For example, the fluid may be provided at a flow rate of about 20 liters per minute. The fluid may additionally be used to reduce matter generated by interaction of the laser beam with a surface of the product from interacting with the print head, for example by way of an air knife as described above with reference to FIG. 2.

The cooling system 310 may additionally be configured to provide cooling to the laser source 110. For example, the cooling system 310 may be configured to direct the flow of fluid to the laser source 110 and thereby provide cooling to the laser source 110. The fluid may be provided to the laser source 110 after filtration. The fluid may be provided to the laser source 110 before the fluid is used to cool the marking head 120. Fluid provided to the laser source may be provided at a greater flow rate than provided to the marking head in order to provide effective cooling. The flow rate required to cool the laser source 110 may at least partially depend upon a distribution of heat load on the laser source 110, a duty cycle of the laser source 110, etc. In some embodiments the cooling system 310 may use part of the fluid used to cool the laser source to also cool components in the marking head.

The cooling system 310 may comprise a fan 320 configured to generate the flow of extraction fluid. The cooling system 310 may comprise a filter 330 configured to filter the fluid. The filter 300 may be replaceable after having collected a given amount of matter. The filter 300 may comprise a plurality of filters configured to filter fluid dependent upon its use. For example, fluid for cooling may be filtered by a first filter. In some embodiments fluid used for extraction of material from the marking head may be returned to the cabinet and reused for cooling. Where such recirculation of air is used additional and/or specialty filters may be required to extract material from the air before it is reused for cooling. In some embodiments there may be three filters applied, a first filter for filtering cooling air for the marking head, a second filter for filtering cooling air for the system (laser source, power supply, electronics) a further specialty filter to filter air used for extraction of material from the marking head.

The cabinet 160 may comprise a cooling device 340 configured to cool the fluid before the fluid is directed to the laser source. The cooling device 340 may, for example, comprise a compressor or a heat exchanger.

The cabinet 160 may further comprise a power supply 350 configured to provide power to the laser source 110. The cooling system 310 may be configured to provide cooling to the power supply 350. The cabinet 160 may further comprise a controller 360 for controlling the laser source 110, the cooling system 310 and/or marking head 120. The cooling system 310 may be configured to provide cooling to the controller 270.

Figure 4:
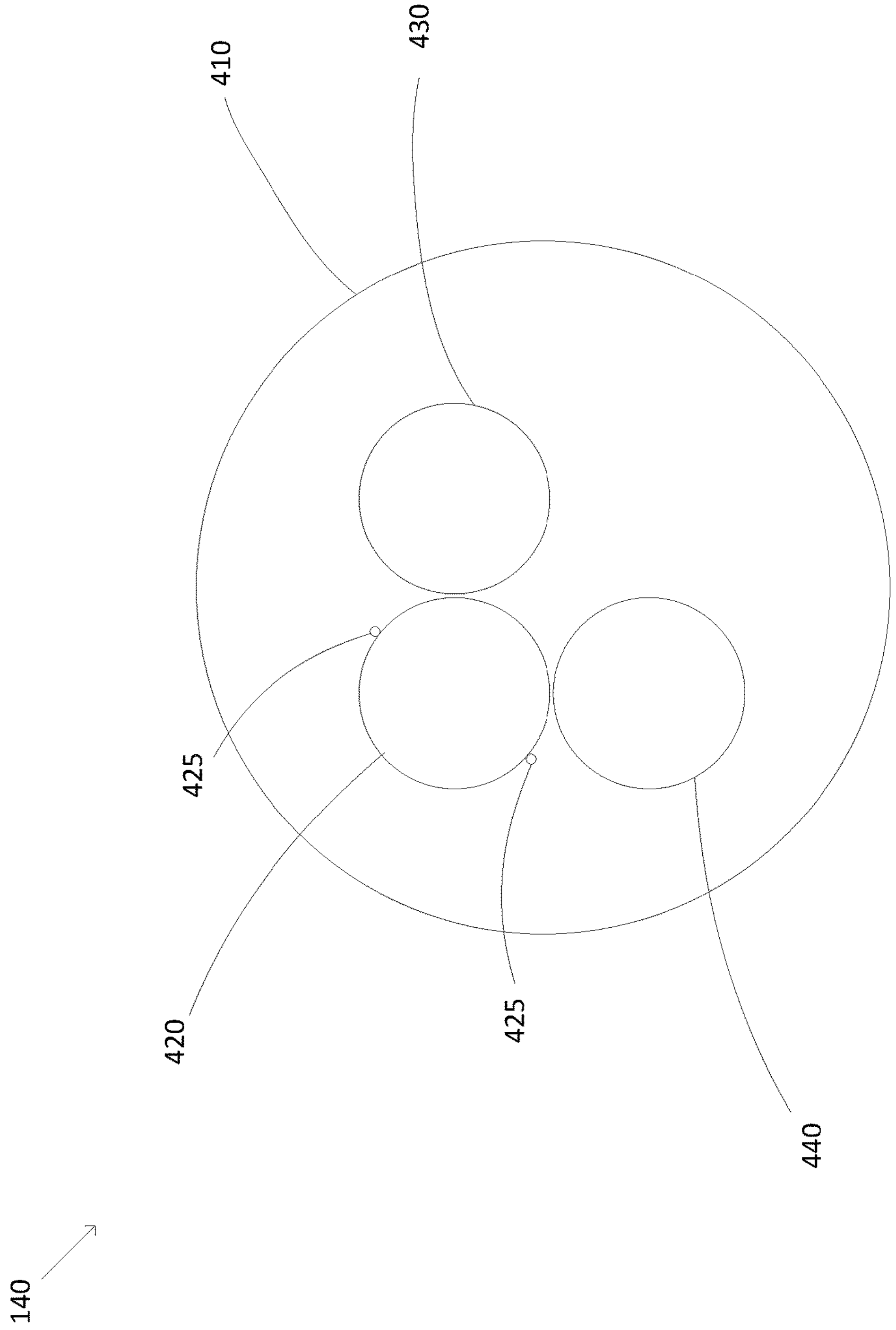
FIG. 4 schematically depicts a cross-sectional view of the umbilical assembly of the laser marking system of FIG. 1.

FIG. 4 schematically depicts a cross-sectional view of umbilical assembly 140 of FIG. 1. The umbilical assembly 140 comprises an umbilical housing 410 that houses one or more conduits for transmitting one or more components from the cabinet 160 to the marking head 120. The one or more conduits comprise an optical fiber 420 for transmitting a laser beam. The one or more conduits may further comprise an electrically conductive cable 430. The one or more conduits may further comprise ducting 440 for transmitting a fluid, such as the fluid for cooling one or more components of the marking head described above. The optical fiber 420 may be provided with one or more fiber failure detector wires 425, as described in more detail below.

The umbilical housing 410 may comprise a continuous tube. That is, the umbilical housing 410 may have an opening at either end only, but may otherwise have no further openings or portions that are openable. An internal diameter of the umbilical housing is large enough to accommodate the collimator 210 of the marking head of the laser marking system shown in FIG. 2. The collimator, isolator and optical fiber 420 may comprise an optical assembly. The optical assembly may be manufactured such that separation of the collimator and/or isolator from the optical fiber 420 after manufacture of the optical assembly may not be possible after manufacture. During manufacture of the laser marking system, the optical assembly may be provided integrally formed. The collimator may be passed through the umbilical housing and configured within the marking head 120 and the isolator may be configured within the cabinet 160. By positioning the isolator in the cabinet, the internal diameter of the umbilical housing may be relatively small as the relatively small collimator can be passed through the umbilical housing whilst maintaining connection between the collimator and the isolator.

The umbilical assembly 140 may be reversibly connectable to the marking head 120 of the laser marking system 100 of FIG. 1. The umbilical assembly may be reversibly connectable to the cabinet 160 of the laser marking system 100 of FIG. 1. The umbilical assembly 140 may be reversibly sealable to the marking head 120 and the cabinet 160 of the laser marking system 100 of FIG. 1 so as to prevent ingress of fluid or debris. An outer surface of the umbilical housing 410 may comprise a chemically resistant material and/or a heat resistant material and/or a material that is impervious to water and/or a hygienic material. The outer surface of the umbilical housing 410 may be smooth.

The electrically conductive cable 430 may be configured to transmit a control signal, e.g. from the controller 360 (shown in FIG. 3) to the steering mechanism 220 (shown in FIG. 2). The electrically conductive cable 430 may be configured to transmit one or more sensor signals, e.g. from components such as the galvanometers and/or sensors located within the marking head to the controller 360 and/or to a user interface of the laser marking system 100. For example, signals may be transmitted from the galvanometers to the controller that indicate a position of the galvanometers to provide position feedback to the controller. The electrically conductive cable 430 may be configured to transmit power and signals to other components within the marking head, e.g. from the power supply 350 (shown in FIG. 1) to the focus modifier 240 (shown in FIG. 2).

In some embodiments the umbilical assembly 140 may be provided with features that prevent damage to the one or more conduits, for example during configuration of the laser marking system 100. In one embodiment one or more of the conduits may be longer than the length of the umbilical housing 410. That is, one or more of the conduits may be provided with an additional portion such that if the umbilical housing 410 is stretched, the additional portion prevents the one or more conduits from also stretching. Typically optical fibers are relatively inflexible and stretching of optical fibers can result in damage to the optical fiber. As such, optical fiber 420 in particular may be provided with such an additional portion. The additional portion may be provided in any convenient location within the umbilical assembly. For example, the additional portion may be provided adjacent to a connecting portion of the umbilical assembly for connecting to one or both of the marking head and/or cabinet. Additionally or alternatively a relatively inelastic elongate member may be provided within the umbilical assembly 140 to restrict stretching of the umbilical assembly 140 and consequent stretching of the conduits of the umbilical assembly. The elongate member may be, for example, a metal wire that extends along the length of the umbilical assembly. The elongate member may be, for example, mechanically coupled to the cabinet and marking head so as to prevent or reduce extension of the umbilical assembly.

The laser marking system 100 may further comprise a user interface, e.g. a graphical user interface. The user interface may form part of the controller 360. The user interface may, for example, comprise a screen for providing visual signals to a user and/or a speaker for providing audio signals to a user. The laser marking system 100 may comprise a transceiver for remote control of the laser marking system 100. The laser marking system 100 may comprise a connection (e.g. an Internet connection of an Ethernet connection) for integration with other devices (e.g. on a production line of which the laser marking system forms a part) via the Internet of Things.

The laser marking process may include providing radiation to the umbilical assembly 140 by coupling a radiation source such as, for example, a fiber laser to the umbilical assembly 140. The coupling of the radiation source to the umbilical assembly is interposed by the optical isolator 150. The umbilical assembly 140 may be connected to the marking head 120. An optical fibre of the umbilical assembly 140 may direct the radiation to a collimator of the marking head 120.

Separation of the isolator from the collimator allows the isolator to be located outside of the marking head 120, thereby enabling a small, lightweight marking head 120 to be used instead of bulky and heavy known marking heads. The steering mechanism 220 may further provide a compact way of controlling the radiation exiting the marking head 120 that allows a further compact form factor for the marking head 120.

The radiation may exit the marking head 120 and be incident upon a product 130. The radiation may mark, etch or otherwise interact with a desired portion of a surface of the product 130 in order to change an appearance of the product 130.

The umbilical assembly 140 further advantageously transmits control signals, power, sensor signals, etc. between components of the cabinet 160 (e.g. the laser source 110 and/or the controller 360) and the marking head 120 whilst being flexible enough to easily reposition the marking head 120 with respect to a production line. The provision of the isolator separate from the print head allows the collimator to be passed through a substantially continuous umbilical housing. Providing a substantially continuous umbilical housing may allow an umbilical assembly to be provided that meets International Protection Marking standards ("IP", sometimes known as Ingress Protection Marking) that have not previously been achieved by laser marking systems. For example, a laser marking system may be provided in which the umbilical and marking head meeting IP65 to IP69 standards. This may be advantageous in various environments in which laser marking is desirable to be provided.

In some instances, for example, a laser marking head may be retrofitted into a system that previously utilized a continuous inkjet marking head of similar dimensions. Retrofitting a system to include a laser marking head instead of a continuous inkjet marking head may reduce the cost of ownership of the system by reducing the need to purchase additional components such as components for positioning the marking head on a production line.

A laser marking head as disclosed herein may weigh about 0.5 kg, about one tenth the weight of many existing systems. Whereas in conventional marking systems a marking head may be large and substantially immobile once installed by a technician, a compact marking head of the sort described here may be easily re-configured in order to meet changing use requirements. That is, the form factor, size, and weight of aspects and embodiments of the laser scanner/marker system disclosed herein provide for the disclosed laser scanner/marker system to be more easily manipulated.

For example, the marking head of the laser scanner/marker system including the housing may be mounted on a movable assembly. The movable assembly may permit the marking head to be moved between several different configurations at which marking can be performed. Marks may be applied to different portions of products in each of the different locations. Different marks may be applied at different locations, providing an extended marking field. In fact, by providing movement in three dimensions, it is possible to extend a conventional two dimensional marking field into three dimensions. The moveable assembly may, for example, be a robot arm that may be moved to follow the contours of a three dimensional object such as a bottle while retaining the same focal distance, for example, about 5 mm from the surface of the object. The ability to move the marking head of the laser scanner/marker system relative to objects being marked may eliminate the need for a stage of a system through which the objects pass to be moveable, thus reducing the mechanical complexity of the system as compared to some existing systems. The ability to move the laser marking head may provide various advantages. For example, the laser marking head may allow three-dimensional laser marking to be provided without requiring manipulation of the target to be marked. In other embodiments the head may provide for use of a laser beam for laser cleaning of complex and/or large targets, such as turbine blades, where moving or manipulation of the target may be difficult. Additionally, a single marking head may be quickly transferred between multiple installation locations, or orientations, to mark products of a different size or mark at a different location on a product. To enable such flexibility in marking arrangements, a plurality of mounting locations may be provided within a laser marking system.

However, such flexibility may introduce safety risks, which would have been avoided with a static or less configurable system. For example, whereas a fixed system may be configured in an inherently safe way, such that a radiation beam could not escape from a shielded environment, providing a moveable head introduces a risk that a radiation beam could be directed into an unshielded location, for example at an operator.

Figure 5:
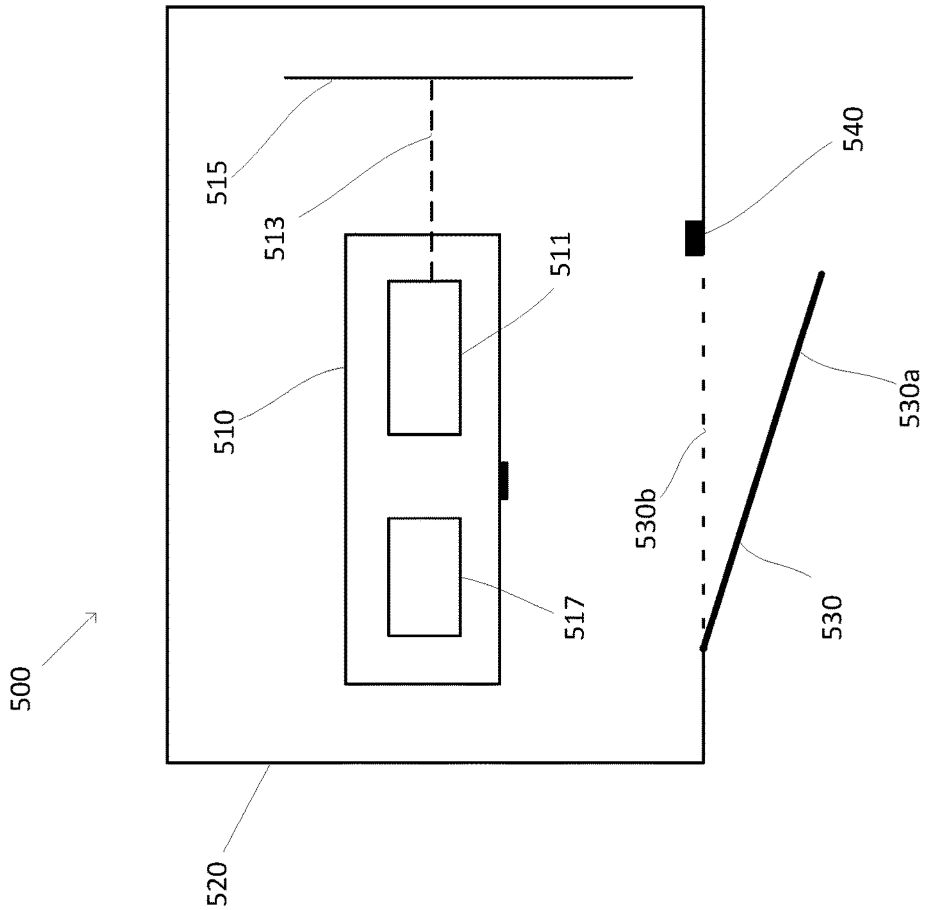
FIG. 5 schematically depicts a cross-sectional view of a known laser marking system.

As shown in FIG. 5, a conventional laser marking installation 500 may comprise a marking system 510, which is installed within a shielded area 520. The marking device comprises a radiation source 511 which emits a radiation beam 513 towards a target 515. The marking system 510 is controlled by a controller 517.

An operator can open a door 530 to access the laser marking system 510. Upon the door being opened, as shown in position 530*a*, a security switch 540 is configured to safely interrupt laser activity, thereby preventing injury to the operator. Such a safety switch may typically be a certified double wired dual-contact switch. When the door is in position 530*b*, the laser device 510 can be operated. The switch 540 provides a signal to the controller 517 which is indicative of the door position.

Similar switches may be used to provide an additional degree of safety associated with a compact laser marking head. One or more interlock input signals may be provided at the laser marking machine so as to enable this type of safety operation. However, rather than (or in additional to) configuring an interlock switch to be associated with a beam shield as described above, an interlock switch may be associated with a marking head mounting arrangement.

Figure 6:
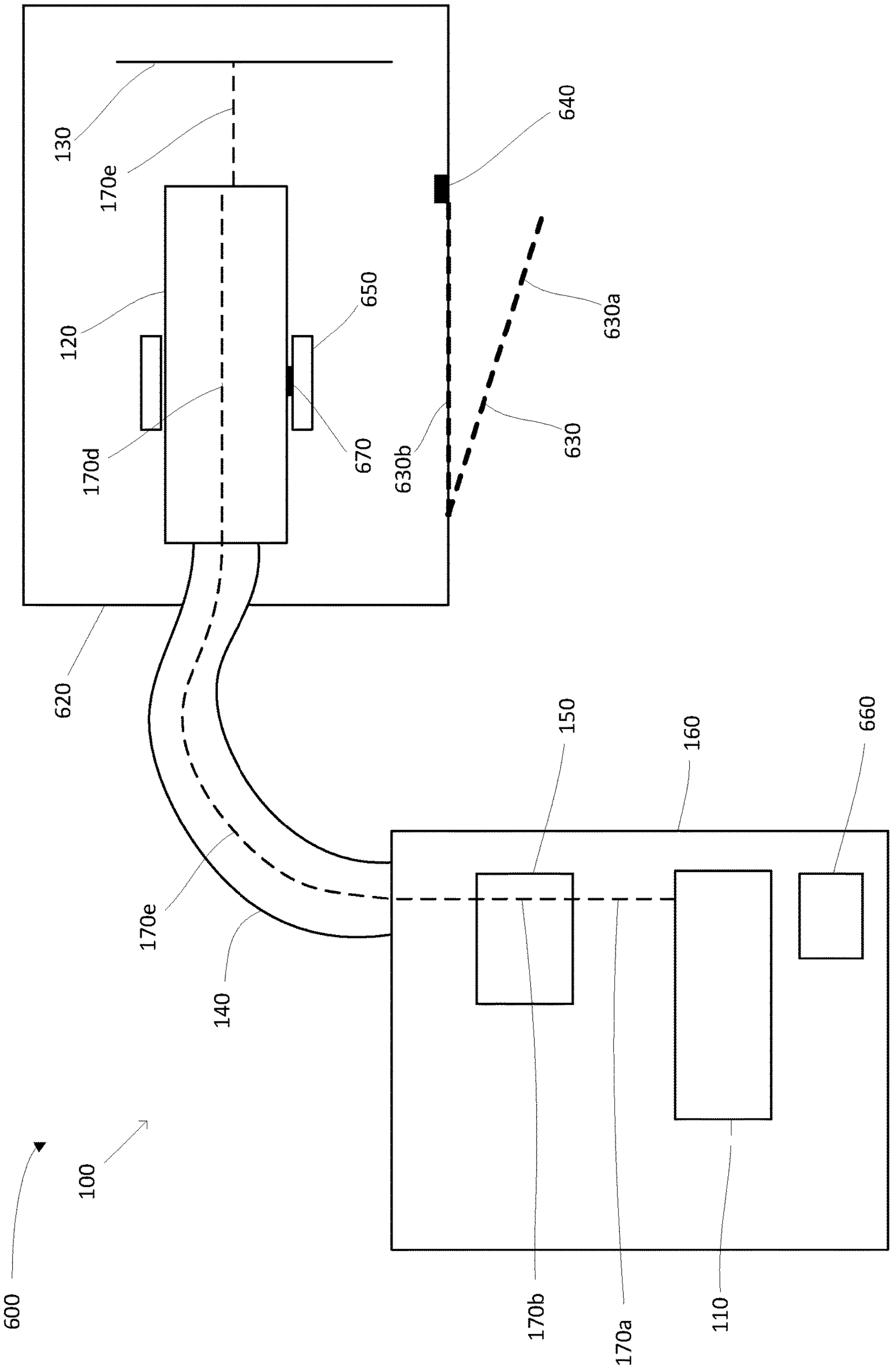
FIG. 6 schematically depicts a cross-sectional view of an exemplary laser marking system.

As shown in FIG. 6, a laser marking installation may comprise a laser marking system 100 substantially as described above with reference to FIG. 1. Similar components will not be described again. The marking head 120 may be installed within a shielded area 620. The area 620 may be substantially enclosed within a safety shield. An operator can open a door 630 to access the laser marking head 120. Upon the door 630 being opened, as shown in position 630*a*, a security switch 640 is configured to safely interrupt laser activity, thereby preventing injury to the operator. When the door is in position 630*b*, the marking head 120 can be operated. The laser marking head 120 is the only component of the electromagnetic radiation system provided within the safety shield. The shielded area 620 may also enclose the product 130, when provided at a processing (e.g. marking) station. The umbilical 140 extends from the shielded area 620 to the cabinet 160.

The marking system installation 600 further comprises a marking head holder 650. The marking head holder 650 may incorporate safety features that interact with a controller 660 of the laser marking system 100 to enable operation only if the marking head 120 is placed in a location that is considered to be safe. Such a location may be predetermined. The marking head 120 may need to be placed with a high degree of accuracy (e.g. $<1$ mm) to ensure safe operation.

In an embodiment, a further switch 670 is be incorporated into a marking head holder 650. As such, the marking system 100 may operate only when the controller 660 has confirmed that a marking head 120 that has been properly installed within the holder 650. It will be understood that a simple contact switch may be sufficient in such an arrangement. Moreover, such an arrangement may provide an advantage compared to a simple contact switch being provided on a marking head 120, since a marking head mounted switch could be activated accidentally by an operator, for example when handling or moving the marking head.

In such an arrangement, a single holder location may be provided in a system, and the system controlled such that it would only enable operation if a marking head is correctly installed in the holder. Of course, if multiple holder locations were provided, each having a safety switch, it may be necessary to provide dummy marking heads to activate all switches simultaneously. It will be noted, however, that such an arrangement may introduce an additional risk that the existence of multiple dummy devices may allow all of the safety switches to be activated even if a marking head was not properly installed in one of the holders (e.g. if a dummy marking head was provided in each holder).

As noted above, a marking head may typically need to be placed with a high degree of accuracy to ensure safe operation. Any safety switch is, therefore, positioned and configured in such a way that it is only activated when the marking head is positioned sufficiently accurately to ensure that necessary safety conditions are met (e.g. that no laser radiation can escape the shielded environment).

One technique for detecting the presence of marking head within a holder is to use an electronic identifier (e.g. RFID, or similar). The switch 670 may thus comprise am electronic identifier, with a corresponding identifiable component being provided on the marking head 120.

It should be noted, however, that such a detection device may be capable of detecting a device that is close to the safe location, but not necessary precisely in the safe location. Thus, a marking head may be electronically detected within a holder (or proximate to a holder), but may still be capable of emitting radiation in an unsafe way.

It will be appreciated that, in some embodiments, the installation 600 may be installed without the shielded area 620, with the switch 640 being omitted. In such an arrangement, on only the switch 670 will be used by the controller 660 to determine the safety of the configuration.

Figure 7:
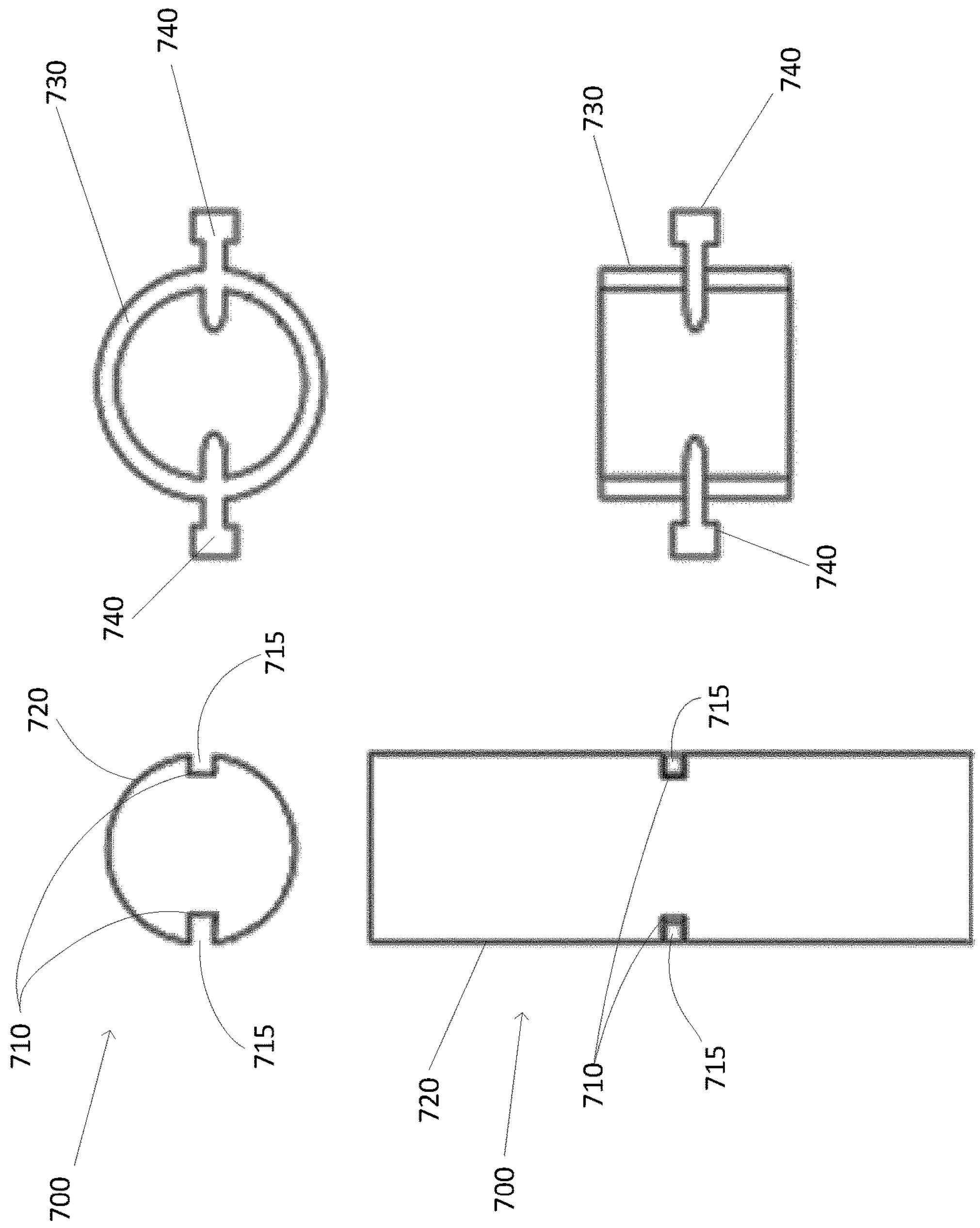
FIG. 7 schematically depicts end and cross-sectional side views of a marking head and a marking head holder of the laser marking system of FIG. 6.

As shown in FIG. 7, in a further embodiment a marking head 700 (which is generally similar to the marking head 120) includes integrated safety switches 710. In view of the risk associated with accidental activation of a switch discussed above, the switches 710 may be integrated in such a way that accidental switch activation during handling is not possible, or is at least highly unlikely.

In the illustrated embodiment two switches 710 are integrated into the housing 720 of the marking head 700. The switches 710 are provided at opposing positions around the circumference of the substantially cylindrical marking head. The switches 710 are each provided within a respective recess 715 provided in the housing 720. The recesses 715 may be designed to prevent water ingress into the marking head 700, which may be necessary in some operating environments.

A cooperating marking head holder 730 is provided which has corresponding mechanical elements 740 (e.g. spring loaded pins) that are configured to activate both switches 710 if the marking head 700 is properly positioned.

The switches 710 may communicate with a marking system controller (not shown) which operates in a similar manner to the controller 660 to prevent operation of the marking head 700 unless it is considered to be in a safe configuration. The switches 710 may, therefore, perform the operation of the switch 670 described above with reference to FIG. 6.

It will be understood, of course, that a single switch 710, or indeed more than two switches 710 may be provided. The switch(es) 710 are operable to confirm that the marking head 700 is safely installed in an appropriately configured holder 730.

Of course, it will be understood that the switches 710 can be used in conjunction with, or independently from, other safety features, such as for example switch 640.

In some embodiments, a system may be arranged such that provided the marking head is properly mounted in the holder 730, the system is inherently safe. For example, the marking head 700 may, when received within the holder 730 close an opening in a shielded environment.

As noted above, the form factor, size, and weight of aspects and embodiments of the laser scanner/marker system disclosed herein provide for the disclosed laser scanner/marker system to be more easily manipulated. However, movement of the marking head 120 (e.g. by a robotic marking system) can result in an increased risk of damage to optical fiber (e.g. fiber 420) delivering electromagnetic radiation from the source 110 to the marking head 120. In some embodiments an optical fiber failure detection system can be provided to detect if the fiber has been damaged. For example, as shown in FIG. 4, the optical fiber 420 may be provided with one or more wires 425 (e.g. copper wires) which run along and/or around the fiber 420. The marking system 100 may comprise a monitor (not shown) configured to monitor an electrical property of the one or more wires 425. The monitor may be provided within the cabinet 160. If a change (e.g. a change in resistance, capacitance, or inductance) is detected, this can be used to indicate breakage, or other damage (e.g. sharp bending) of the fiber 420. That is, the wires may be configured to detect failure of the optical fiber extending between the laser source and the head. The continuity of the wire or wires 425 along the length of the fiber 420 may be monitored. In embodiments, the laser source can be disabled in response to an indication of breakage, reducing any risk that a laser beam could cause damage. Alternatively, or in addition, if an anomalous electrical property is detected, an alert could be raised, prompting a user to inspect the fiber 420 and any umbilical 410 for damage. The optical fiber failure detection system can be operated in combination with or independently of the other safety features described above with reference to FIGS. 6 and 7.

In some embodiments a moveable assembly may be provided that forms part of a computer numerical control (CNC) machine. The marking head may be provided as one of a plurality of tools that may be selected and moved by the moveable assembly of the CNC machine to integrate laser marking within the CNC machine. As described above, the head is not, however, limited to marking and a tool providing other laser functionality may also be provided such as laser cutting, laser drilling, deep engraving, or laser-based surface treatments such as hardening of steel. It will be appreciated that CNC machines provide highly accurate operations. By providing a compact laser head as described above that can be used in a CNC machine, the CNC machine can provide functionality that has previously required removal of a machined piece and subsequent configuration of the machined piece within a further system to provide laser-based operations. Precise laser-based operations may therefore be provided in a single machine without requiring repeat configuration of a machined piece.

The laser marking system described and depicted herein advantageously overcomes problems associated with known laser marking systems discussed above, offering a fully integrated, "plug-and-play" solution for owners of a production line that has a print head having a compact form factor.

Figure 8:
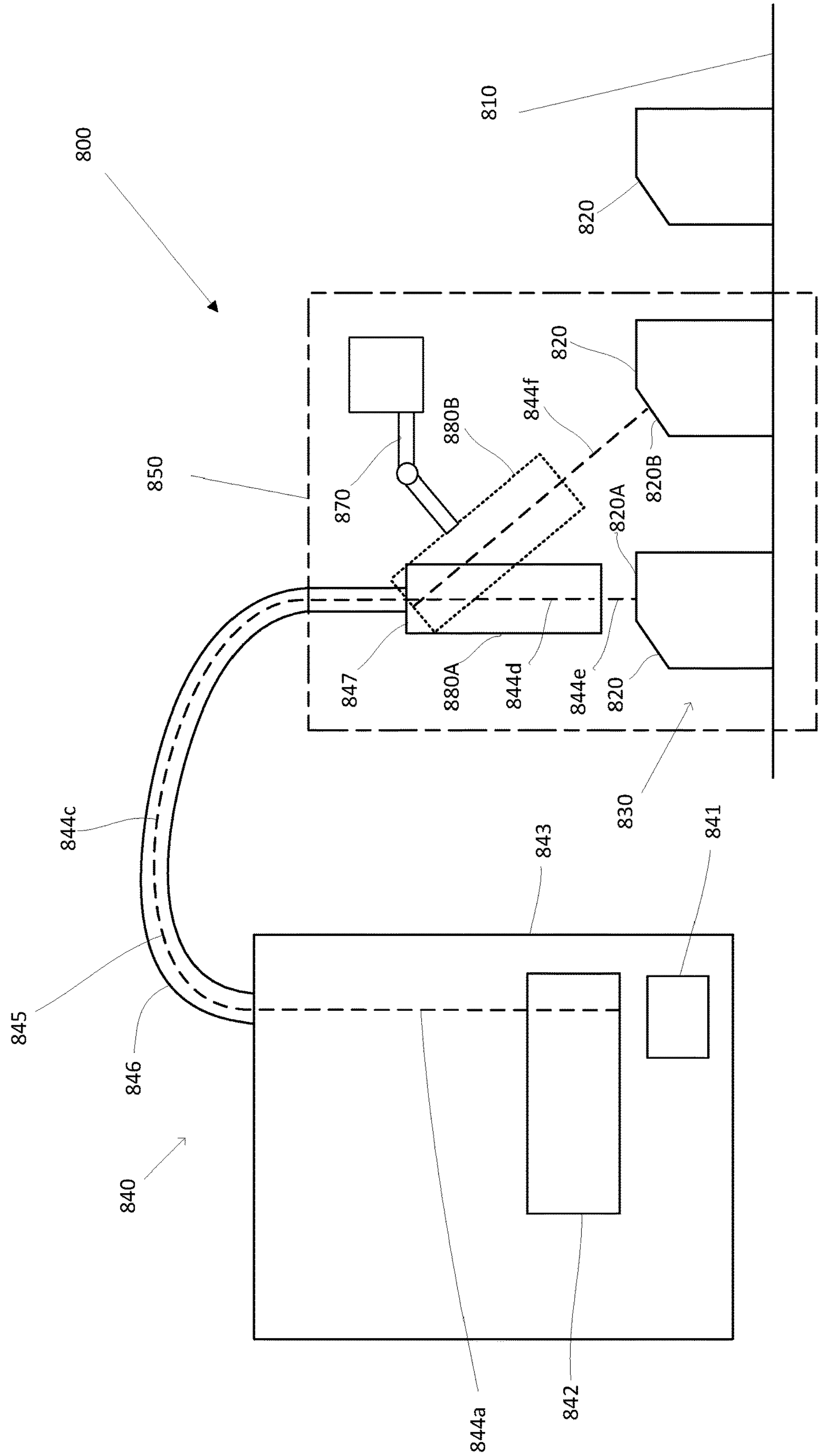
FIG. 8 schematically depicts a system including a processing line and a laser marking system.

A production line to which the laser marking apparatus may be applied may alternatively be referred to as a processing line. FIG. 8 illustrates a system 800 including such a processing line 810. Products 820 to be marked, or otherwise processed, are transported by the production line 810 past a marking (or processing) station 830 at which radiation can be directed at the product. The processing system 800 includes an electromagnetic radiation system 840 (e.g. a laser marking apparatus) which may be generally of the sort described above. In some implementations, the electromagnetic radiation system 840 may omit certain features described above. For example, the electromagnetic radiation system may comprise a power supply 841, and an electromagnetic radiation source 842 housed within a cabinet 843. The radiation source 842 may be configured to emit radiation along a radiation path 844*a*-*e*, which passes along an optical fiber 845 (e.g. a transport fiber) housed within an umbilical 846 to a marking head 847. The marking head 847 is configured to direct radiation along a marking path 844*e* at products 820 when they are located at the marking station 830. The radiation path 844 comprises a source path portion 844*a* within the cabinet (which may include gain components), a transport path portion 844*c* within the umbilical 845, a steering path portion 844*d* within the marking head 847 (where it may be steered and/or focused) and a marking path portion 844*e* between the marking head and the product 820. The processing station 830 and the marking head 847 are enclosed within a safety shield 850, which is configured to prevent stray radiation from causing a safety hazard (either to users, or other equipment).

In such an implementation, a compact marking head may be provided (e.g. with dimensions as described above), and a processing station 830 provided within the safety shield 850 which surrounds just the marking head 847 of the electromagnetic radiation system 840, with all remaining components of the radiation system being provided in the cabinet 830 (i.e. outside the shield 850). Of course, a portion of the umbilical assembly may also be present within the safety shield. In such an arrangement, the marking head may still be considered to be the only component of the radiation system within (e.g. entirely within) the safety shield 850.

The marking system 840 may operate as described above with reference to the marking system 100.

The marking system 840 may optionally further include an optical isolator (not shown) between the radiation source 842 and the umbilical 845, which defines an isolator path portion. Alternatively, or in addition, the system 800 may include interlock switches provided within a holder for the marking head 847, for example as described above with reference to FIGS. 6 and 7.

The marking system may further comprise a plurality of mounting locations for the marking head 847. The marking system may further comprise a moveable element 870 for moving the marking head 847 between different configurations. For example, in a first configuration 880A the marking head 847 may be configured to mark a top surface 820A of a product 820, whereas in a second configuration 880B the marking head 847 may be configured to mark a sloping surface 820B of a product 820 by directing the beam along a second marking path 844*f*. The marking head 847 may be automatically moved between configurations (e.g. by the moveable element 870), or may alternatively be reconfigured by a user, for example by placing the marking head in various different holders (not shown).

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. The acts of methods disclosed herein may be performed in alternate orders than illustrated, and one or more acts may be omitted, substituted, or added. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The electromagnetic radiation steering mechanism may include various types of optical components, such as refractive, reflective, magnetic, electromagnetic, electrostatic, and/or other types of optical components, or any combination thereof, for directing, shaping, and/or controlling electromagnetic radiation.

Although specific reference may be made in this text to the use of an electromagnetic radiation steering mechanism in the marking of products, it should be understood that the electromagnetic radiation steering mechanism described herein may have other applications. Possible other applications include laser systems for engraving products, optical scanners, radiation detection systems, medical devices, etc.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. An electromagnetic radiation system for directing an electromagnetic radiation beam at a target comprising:

an electromagnetic radiation source configured to provide the electromagnetic radiation beam;

a head operatively connected to the electromagnetic radiation source and configured to project the electromagnetic radiation beam on to the target;

an umbilical assembly operatively connected to the electromagnetic radiation source and the head and configured to transmit the electromagnetic radiation source to the head;

an optical isolator positioned between an optical fiber amplifier and the umbilical assembly; and at least two head mounting locations for mounting the head, each mounting location being configured to support the head for projecting the electromagnetic radiation beam on to a product provided at a processing location.

2. The system of claim 1, wherein the head comprises a collimator, wherein the collimator is configured to receive electromagnetic radiation from the umbilical assembly.

3. The system of claim 2, wherein the collimator is optically coupled to the optical isolator by the umbilical assembly.

4. The system of claim 1, wherein the umbilical assembly comprises an optical fiber configured to transmit the electromagnetic radiation beam from the electromagnetic radiation source to the head.

5. The system of claim 4, wherein the optical fiber configured to transmit the electromagnetic radiation beam from the electromagnetic radiation source to the head is a passive fiber configured to transmit the electromagnetic radiation beam from the optical isolator to the head without amplification.

6. The system of claim 4, wherein a length of the optical fiber is greater than a length of the umbilical assembly.

7. The system of claim 1, further comprising a cabinet, wherein the electromagnetic radiation source is configured within the cabinet, and wherein the optical isolator is configured within the cabinet.

8. The system of claim 1, further comprising a moveable assembly, wherein the moveable assembly operatively connected to the head to move the head relative to the target.

9. The system of claim 1 further comprising a holder, wherein the system is configured to permit use of the head only if the head is held by the holder in a predetermined configuration, the predetermined configuration being determined based upon an interaction between cooperating features of the holder and the head.

10. A system comprising:

an electromagnetic radiation system according to claim 1; and a processing line configured to transport products to be processed past a processing station;

wherein the electromagnetic radiation system is configured to direct said radiation beam at products located at the processing station.

11. The system of claim 10, further comprising a safety shield configured to substantially enclose the processing station, wherein said head is the only component of said electromagnetic radiation system provided within the safety shield.

12. The system of claim 10, further comprising a moveable assembly, said moveable assembly being configured to support the head, and to move the head relative to products located at the processing station.

13. The system of claim 12, wherein:

the moveable assembly is configured to move relative to products located at the processing station between a first configuration and a second configuration; and the electromagnetic radiation system is configured to apply a mark to said products in at least one of the first and second configurations.

14. The system of claim 10, comprising at least two head mounting locations for mounting said head, each mounting location being configured to support the head for projecting the electromagnetic radiation beam on to a product provided at a processing location.

15. A method of manufacturing an electromagnetic radiation system, the method comprising:

passing a collimator of an optical assembly that includes an optical isolator through an umbilical housing comprising an elongate tube having a first opening at a first end of the elongate tube and a second opening at a second end of the elongate tube, wherein the passing of the collimator comprises passing the collimator from the first opening to the second opening, wherein the optical isolator is connected to the collimator by an optical fiber; and configuring the collimator within a head of the electromagnetic radiation system that is operatively connected to an electromagnetic radiation source and positioned relative to a target, wherein the electromagnetic radiation system is a laser marking system.

16. The method of claim 15, wherein the optical isolator, collimator and optical fiber are integrally formed.

17. The method of claim 15, wherein configuring the collimator within the head comprises fixing the collimator within the head.

18. The method of claim 15, wherein the electromagnetic radiation source comprises a fiber laser.

* * * * *